(12) United States Patent
Matsumoto et al.

(10) Patent No.: US 11,161,274 B2
(45) Date of Patent: Nov. 2, 2021

(54) METHOD FOR MANUFACTURING TRANSPARENT CERAMIC MATERIAL FOR FARADAY ROTATOR

(71) Applicant: SHIN-ETSU CHEMICAL CO., LTD., Tokyo (JP)

(72) Inventors: Takuto Matsumoto, Annaka (JP); Masanori Ikari, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 338 days.

(21) Appl. No.: 16/425,576

(22) Filed: May 29, 2019

(65) Prior Publication Data
US 2019/0366584 A1 Dec. 5, 2019

(30) Foreign Application Priority Data
May 30, 2018 (JP) .............................. JP2018-103013

(51) Int. Cl.
*B28B 1/20* (2006.01)
*C04B 35/645* (2006.01)
(Continued)

(52) U.S. Cl.
CPC .............. *B28B 1/20* (2013.01); *C04B 35/505* (2013.01); *C04B 35/64* (2013.01);
(Continued)

(58) Field of Classification Search
None
See application file for complete search history.

(56) References Cited

U.S. PATENT DOCUMENTS

| 4,937,214 A | | 6/1990 | Morita et al. |
| 5,762,841 A | * | 6/1998 | Shimai .................. C04B 38/007 264/44 |

(Continued)

FOREIGN PATENT DOCUMENTS

| JP | H2-64065 A | 3/1990 |
| JP | 2002-293693 A | 10/2002 |

(Continued)

OTHER PUBLICATIONS

Aung et al., "Development of optical grade (TbxY1-x)3Al5O12 ceramics as Faraday rotator material"., Journal of American Ceramic Society, 100 (9), 4081-4087, (2017).

(Continued)

*Primary Examiner* — Erin Snelting
(74) *Attorney, Agent, or Firm* — Birch, Stewart, Kolasch & Birch, LLP

(57) ABSTRACT

A slurry or slip composed of a dispersion medium and a dispersoid including sinterable raw material powder containing a complex oxide powder represented by the following formula (1):

$$(Tb_{1-x-y}R_xSc_y)_3(Al_{1-z}Sc_z)_5O_{12} \qquad (1)$$

wherein R is yttrium and/or lutetium, $0.05 \le x < 0.45$, $0 < y < 0.1$, $0.5 < 1-x-y < 0.95$, and $0.004 < z < 0.2$ is prepared; the slurry or slip is subsequently enclosed in a mold container to be subjected to solid-liquid separation by centrifugal casting to mold a cast compact; the cast compact is dried thereafter; a dried compact is degreased; a degreased compact is sintered thereafter; and a sintered body is further subjected to a hot isostatic pressing treatment to obtain the transparent ceramic material composed of the sintered body of garnet-type rare earth complex oxide represented by the formula (1).

12 Claims, 2 Drawing Sheets

(51) Int. Cl.
*C04B 35/505* (2006.01)
*C04B 35/64* (2006.01)

(52) U.S. Cl.
CPC .... *C04B 35/6455* (2013.01); *C04B 2235/764* (2013.01); *C04B 2235/9646* (2013.01); *C04B 2235/9653* (2013.01)

(56) References Cited

U.S. PATENT DOCUMENTS

| | | | |
|---|---|---|---|
| 7,166,162 | B2 | 1/2007 | Sekijima et al. |
| 9,030,739 | B2 | 5/2015 | Hatanaka et al. |
| 2004/0035357 | A1 | 2/2004 | Sekijima et al. |
| 2007/0238604 | A1* | 10/2007 | Tang .............. C04B 35/50 501/152 |
| 2013/0038927 | A1* | 2/2013 | Hatanaka ......... C30B 29/28 359/352 |
| 2016/0145765 | A1 | 5/2016 | Matsui et al. |

FOREIGN PATENT DOCUMENTS

| | | |
|---|---|---|
| JP | 3642063 A | 4/2005 |
| JP | 2008-7385 A | 1/2008 |
| JP | 4107292 B2 | 6/2008 |
| JP | 2011-213552 A | 10/2011 |
| JP | 5611329 B2 | 10/2014 |
| JP | 5935764 B2 | 6/2016 |
| JP | 2017137223 A * | 8/2017 |

OTHER PUBLICATIONS

Suzuki et al., "Effect of Sintering Atmosphere and HIP Treatment on Translucency and Mechanical Properties of Alumina Made by High-Speed Centrifugal Compaction Process"., Journal of the Japan Society of Powder and Powder Metallurgy, 47(5), 465-473 (2000).
Tashima et al. "Centrifugal Compaction of Submicron High Purity Alumina Powder"., Journal of the Japan Society of Powder and Powder Metallurgy, 39(1), 39-43 (1992).

* cited by examiner

FIG.2

METHOD FOR MANUFACTURING TRANSPARENT CERAMIC MATERIAL FOR FARADAY ROTATOR

CROSS-REFERENCE TO RELATED APPLICATION

This non-provisional application claims priority under 35 U.S.C. § 119(a) on Patent Application No. 2018-103013 filed in Japan on May 30, 2018, the entire contents of which are hereby incorporated by reference.

TECHNICAL FIELD

The present invention relates to a method for manufacturing a transparent ceramic material composed of a rare earth aluminum garnet-type complex oxide sintered body having translucency in the visible and/or near infrared range, and more particularly to a method for manufacturing a transparent ceramic material suitable for a Faraday rotator constituting a magneto-optical device.

BACKGROUND ART

As for transparent ceramics, an alumina sintered body exhibiting translucency was discovered in 1959, and laser oscillation by a YAG ceramic succeeded in the 1990's, leading to active attempts at optical device applications. There are reports that the transparent ceramics, in which the scattering sources inside the ceramics and the internal strain are thoroughly removed, outperform the optical properties of the single crystal of the composition.

In general, many ceramics are opaque. This is because light is refracted and does not travel in a straight line due to the birefringence possessed by the crystal grains themselves constituting the sintered body, and bubbles, different phases and the like left inside the sintered body. Thus, in order for the ceramics to exhibit translucency, it is important to select optically isotropic cubic crystals and thoroughly remove foreign substances, which 30 are light scattering sources such as bubbles and different phases inside the sintered body. It is needless to say that the basic premise is that the material does not absorb light with a desired wavelength.

However, when the above ceramics transparent to the naked eye are used as optical devices, there is often a problem of the occurrence of birefringence due to the photoelastic effect. The photoelastic effect is a physical phenomenon in which birefringence occurs due to stress such as internal strain, and even optically isotropic cubic crystals give birefringence. The transparent ceramics having internal strain seems to be transparent to the naked eye at a glance, but the depolarization effect dependent on the stress is observed when linearly polarized light is incident thereon.

In particular, an optical isolator using the Faraday effect is applied the effect of rotating a polarization plane when linearly polarized light passes through the inside of a Faraday rotator. Therefore, if the depolarization effect due to the photoelastic effect occurs inside the Faraday rotator, not only the transmittance of the optical isolator is decreased but also part of the light is returned. This is unpreferable because the function of the optical isolator is deteriorated.

One of the major causes of the occurrence of the internal strain of the ceramics is a molding step thereof. In a case of uniaxial pressing typifying a dry pressing method as an example, the main cause is packing unevenness formed when a raw material powder is packed in a pressing tool or force transmission unevenness during molding. As a result, physical deviation (density unevenness) occurs in a compact. Some of the density unevenness inside the compact are removed through a sintering step or an annealing step, which are subsequent steps, but those that could not be removed are left as the internal strain of the ceramics as result (so-called residual strain).

Therefore, a slip casting method is used as a technique of uniformly molding a ceramic raw material. The slip casting is one of wet molding methods and is a technique of molding by dispersing the raw material, pouring a slurry having fluidity into a mold, and separating it into a dispersion medium and a dispersoid (raw material). It is generally known that a compact created by the slip casting method can be formed with high density and low defects as compared with the dry molding methods such as a pressing method.

There is a centrifugal molding method (centrifugal casting method) as one of the slip casting methods. The centrifugal molding method is a molding method of separating a slurry (slip) in which a raw material is dispersed, into a dispersion medium and a dispersoid by centrifuging. The centrifugal molding method is characterized by less contamination with Ca and S as compared with a pressure casting method using gypsum as a mold. Moreover, attempts have been made to use porous resin, metal, unglazed ceramics and the like for the purpose of decreasing contamination from the gypsum mold, but they have problems that clogging is likely to occur, and the mold is expensive. Furthermore, in the pressure casting, bubbles (spaces) usually occur inside the compact if the molding is performed without removing the bubbles present inside of the slip. Thus, the casting is generally performed after defoaming treatment under reduced pressure. In contrast to these, in the centrifugal molding, a commercially available centrifuge tube can be used, and various materials, such as glass, resin and metal, can be selected according to the purpose. Unless being damaged, the centrifuge tube can be washed to be recycled, which is also advantageous in terms of the costs. Further, since the bubbles and coarse foreign substances inside the slip are discharged to the outside of the compact by the action of the centrifugal force, it is said that a compact with extremely low defects can be obtained without defoaming treatment or addition of a defoaming agent. Moreover, since the influence of the concentration and viscosity of the slip used for the molding is small as compared with the pressure casting method, it is said that it is easy to create and manage the slip ("Centrifugal Compaction of Submicron High Purity Alumina Powder," Journal of the Japan Society of Powder and Powder Metallurgy, 39(1), 39-43 (1992) (Non-Patent Document 1)).

Furthermore, disclosed is a process for creating an alumina sintered body, which exhibits translucency, by subjecting alumina raw material powder to centrifugal molding and hot isostatic pressing (HIP) treatment following sintering in hydrogen or vacuum ("Effect of Sintering Atmosphere and HIP Treatment on Translucency and Mechanical Properties of Alumina Made by High-Speed Centrifugal Compaction Process," Journal of the Japan Society of Powder and Powder Metallurgy, 47(5), 465-473 (2000) (Non-Patent Document 2)).

However, even if the bubbles inside the sintered body are eliminated, alumina only exhibits translucency because the crystal grains have birefringence, and the information on the residual strain inside the sintered body and the photoelastic effect associated therewith is not mentioned.

Furthermore, Patent Document 1 (JP-A H02-64065) discloses a process for producing a crystal grain oriented ceramic by forming β- or β''-alumina, barium ferrite and strontium ferrite particles with the action of the centrifugal force. Since a hexagonal crystal raw material is also centrifugally molded and sintered in this process, there is no description about the optical properties of the sintered body.

Incidentally, a TGG crystal ($Tb_3Ga_5O_{12}$) and a TSAG crystal (($Tb_{(3-x)}Sc_x)Sc_2Al_3O_{12}$) are conventionally known as materials used as a Faraday rotator constituting the aforementioned optical isolator (JP-A 2011-213552 (Patent Document 2) and JP-A 2002-293693 (Patent Document 3)). The TOG crystal is now widely used for standard fiber laser devices. Meanwhile, the Verdet constant of the TSAG crystal is said to be about 1.3 times that of the TGG crystal, and this is also a suitable material mounted in the fiber laser devices. However, since Sc is a very expensive raw material, the TSAG crystal is not employed due to the manufacturing costs.

Although the development of the TSAG crystal has been still continued as in JP-B 5611329 (Patent Document 4) and JP-B 5935764 (Patent Document 5), but none can achieve reduction in Sc usage so that the TSAG crystal is not widely used.

Other than the above, a TAG crystal ($Tb_3Al_5O_{12}$) has been known for a long time as a Faraday rotator with the Verdet constant greater than that of the TSAG. However, since the TAG crystal is an incongruent melting crystal, there is a restriction that a perovskite phase is first formed (precipitated) at a solid-liquid interface and then a TAG phase is formed (precipitated). In other words, the TAG crystal can be grown only in a state where the garnet phase and the perovskite phase are always mixedly present, and good-quality, large-size TAG crystal growth has not been realized.

JP-B 3642063 (Patent Document 6) and JP-B 4107292 (Patent Document 7) propose, as a means for suppressing this mixed crystal, a process for preferentially precipitating the perovskite phase, which is the initial phase, in a porous medium by making a polycrystalline raw material rod or a seed crystal for FZ growth porous. However, in reality, as the melted position moves, the position where the perovskite phase is likely to precipitate also moves. Thus, even if only the interface of the seed crystal and the polycrystalline raw material rod was made porous, it was inherently impossible to suppress the precipitation of the perovskite phase completely.

Under such restrictions, JP-A 2008-7385 (Patent Document 8) has proposed a material for creating the oxide of the TAG composition by ceramics and giving translucency. The ceramics can be produced by sintering at a temperature lower than the melting point by 100° C. or more so that it is possible to clear the problem of incongruent melting, which has been the problem in the single crystal growth. The decomposition of the TAG actually begins at 1,840° C. or more. Thus, if sintering densification can be done to the highest theoretical density at this temperature or less, a transparent sintered body of the TAG single phase can be obtained.

Patent Document 8 discloses a process for producing a ceramic that has a garnet structure and is composed of terbium aluminum oxide, and the process comprises the steps of: compounding raw materials; calcining; crushing the calcined powder; forming; and firing, in which a TAG ceramic with high light transmittance can be created if the average particle size of the calcined powder after the crushing is 0.2 μm to 1.6 μm in the step of crushing the calcined powder, and the density after the forming is 3.26 g/cm³ or more in the step of forming.

However, according to Patent Document 8, the translucency thereof is extremely insufficient, and the maximum linear transmittance with the thickness of 1.5 mm was only 35%. By the way, in a case where the TAG is utilized as a Faraday element such as an optical isolator, for example, if a general magnet used for TGG for a 1.06 μm band laser is used, the element length necessary for rotating the polarized light by 45 degrees is about 15 mm, which is approximately ten times the length in the document. Suppose that the material is of 35% with the thickness of 1.5 mm and the element length thereof is elongated by ten times. The transmittance is estimated to be less than 0.01%, that is, nearly zero, and the element does not function at all as the Faraday rotator.

That is, even with a ceramic production process capable of suppressing the occurrence of different phases, the TAG of a practical level has not existed so far. Note that Patent Document 7 indicates that the Verdet constant increases as compared with the TAG when Ce is substituted for some Tb in the TAG crystal. As the Verdet constant increases, the element length necessary to rotate the incident light by 45 degrees can be shortened. Thus, the total absorbed amount is reduced. However, with the linear transmittance of 35% with the thickness of 1.5 mm, the 45 degree rotation thickness transmittance is less than 1% even if the element length is halved. This is far from practical use.

CITATION LIST

Patent Document 1: JP-A H02-64065
Patent Document 2: JP-A 2011-213552
Patent Document 3: JP-A 2002-293693
Patent Document 4: JP-B 5611329
Patent Document 5: JP-B 5935764
Patent Document 6: JP-B 3642063
Patent Document 7: JP-B 4107292
Patent Document 8: JP-A 2008-7385
Non-Patent Document 1: "Centrifugal Compaction of Submicron High Purity Alumina Powder," Journal of the Japan Society of Powder and Powder Metallurgy, 39(1), 39-43 (1992)
Non-Patent Document 2: "Effect of Sintering Atmosphere and HIP Treatment on Translucency and Mechanical Properties of Alumina Made by High-Speed Centrifugal Compaction Process," Journal of the Japan Society of Powder and Powder Metallurgy, 47(5), 465-473 (2000)
Non-Patent Document 3: Yan Lin Aung, Akio Ikesue, Development of optical grade ($Tb_xY_{1-x})_3Al_5O_{12}$ ceramics as Faraday rotator material, J. Am. Ceram. Soc., 100(9), 4081-4087 (2017)

SUMMARY OF THE INVENTION

As described above, although the fact has been reported so far in which a ceramic compact with high purity and low defects can be created for the ceramics using the centrifugal molding method as compared with a general pressure casting method, there is no reports on the transparency and extinction ratio performance of transparent ceramics, especially transparent ceramics for the Faraday rotator, which are cubic crystals created by the centrifugal molding method.

The present invention has been made in light of the above circumstances, and an object thereof is to provide a method for manufacturing a transparent ceramic material, which is for a Faraday rotator and is excellent in transparency and extinction ratio performance, by a centrifugal casting method.

Incidentally, under the above situations, recently disclosed is a dense ceramic sintered body whose composition is $(Tb_xY_{1-x})_3Al_5O_{12}$ (x=0.5 to 1.0) and which has a higher extinction ratio than the existing TGG crystal (existing 35 dB has been improved to 39.5 dB or more) and can also reduce insertion loss (existing 0.05 dB has been improved to 0.01 to 0.05 dB) (Non-Patent Document 3). Since the material disclosed in Non-Patent Document 3 is ceramic at the outset, there is no precipitation of a perovskite different phase, which was the problem in the TGG crystal. Moreover, by substituting Y ions for some Tb ions, the loss can be further reduced. Thus, an extremely high-quality garnet-type Faraday rotator can be obtained by this material. However, when the inventors actually conducted the replication study, it was confirmed that the reproducibility is very poor and a high-quality ceramic sintered body with less insertion loss than the TGG crystal is hardly obtained.

Based on these findings, the inventors have conducted intensive studies and achieved the present invention.

That is, the present invention is a method for manufacturing a transparent ceramic material for a Faraday rotator described below.

1. A method for manufacturing a transparent ceramic material for a Faraday rotator comprising the steps of:

preparing a slurry or slip composed of a dispersion medium and a dispersoid including sinterable raw material powder containing a complex oxide powder represented by the following formula (1):

$$(Tb_{1-x-y}R_xSc_y)_3(Al_{1-z}Sc_z)_5O_{12} \quad (1)$$

wherein R is yttrium and/or lutetium, $0.05 \leq x < 0.45$, $0 < y < 0.1$, $0.5 < 1-x-y < 0.95$, and $0.004 < z < 0.2$;

enclosing the slurry or slip in a mold container and subjecting the mold container with the slurry or slip to centrifugal casting to separate the slurry or slip into a solid and liquid thereby molding a cast compact;

drying the cast compact;

degreasing a dried compact;

sintering a degreased compact; and further subjecting a sintered body to a hot isostatic pressing treatment to obtain a transparent ceramic material composed of the sintered body of garnet-type rare earth complex oxide represented by the formula (1).

2. The method according to 1, further comprising the step of performing the following treatment at least once before subjecting to centrifugal casting, and thereafter subjecting the mold container with the slurry or slip to centrifugal casting, the treatment comprising subjecting the mold container with the slurry or slip to preliminary centrifugation treatment to separate and remove some of the dispersion medium from the slurry or slip thereby concentrating the dispersoid in it, and further enclosing the additional prepared slurry or slip into the mold container.

3. The method according to 2, wherein when the additional prepared slurry or slip is added into the mold container, an interface between the added slurry or slip and a sediment of the dispersoid and the remaining dispersion medium in the mold container is stirred and mixed to be enclosed.

4. The method according to 2 or 3, wherein the preliminary centrifugation treatment is to performed with a centrifugal force of 300 to 1,000 G.

5. The method according to any one of 1 to 4, wherein the centrifugal casting is performed with a centrifugal force of 1,500 to 5,000 G.

6. The method according to any one of 1 to 5, wherein R is yttrium.

7. The method according to any one of 1 to 6, wherein the sinterable raw material powder further contains a sintering aid.

8. The method according to any one of 1 to 7, wherein the dispersoid includes the sinterable raw material powder and a binder.

9. The method according to any one of 1 to 8, wherein the dispersion medium is water and/or a lower alcohol having 1 to 4 carbon atoms.

10. The method according to any one of 1 to 9, wherein the slip is a sediment obtained by allowing the slurry composed of the dispersion medium and the dispersoid including the sinterable raw material powder to stand for a predetermined time.

11. The method according to any one of 1 to 10, wherein the mold container is a cylindrical container having a longitudinal direction as a centrifugal direction of the centrifugal casting.

12. The method according to any one of 1 to 11, wherein the transparent ceramic material with an extinction ratio of 40 dB or more at a wavelength of 1,064 nm for an optical path length of 25 mm is obtained, the extinction ratio being measured in accordance with a polarizer test method of JIS C5877-2: 2012.

Advantageous Effects of the Invention

According to the present invention, it is possible to provide a transparent ceramic material for a Faraday rotator, which is composed of a garnet-type complex oxide sintered body containing terbium, yttrium and/or lutetium, has a higher extinction ratio performance than press molding, and is suitable for constituting a magneto-optical device such as an optical isolator.

DESCRIPTION OF THE PREFERRED EMBODIMENT

Method for Manufacturing Transparent Ceramic Material for Faraday Rotator

Hereinafter, a method for manufacturing a transparent ceramic material for a Faraday rotator according to the present invention is described.

A method for manufacturing a transparent ceramic material for a Faraday rotator according to the present invention is characterized by preparing a slurry or slip composed of a dispersion medium and a dispersoid including sinterable raw material powder containing complex oxide powder represented by the following formula (1):

$$(Tb_{1-x-y}R_xSc_y)_3(Al_{1-z}Sc_z)_5O_{12} \quad (1)$$

wherein R is yttrium and/or lutetium, $0.05 \leq x < 0.45$, $0 < y < 0.1$, $0.5 < 1-x-y < 0.95$, and $0.004 < z < 0.2$; subsequently enclosing the slurry or the slip in a mold container and subjecting the mold container with the slurry or slip to centrifugal casting to separate the slurry or slip into a solid and liquid thereby molding a cast compact; drying the cast compact thereafter, degreasing a dried compact; sintering a degreased compact thereafter, and further subjecting a sintered body to a hot isostatic pressing treatment to obtain the transparent ceramic material of the sintered body of garnet-type rare earth complex oxide represented by the formula (1).

Herein, the transparent ceramic material for the Faraday rotator is manufactured by the following procedure.

Sinterable Raw Material Powder

First, a sinterable raw material powder containing complex oxide powder (ceramic powder) represented by the following formula (1) is created:

$$(Tb_{1-x-y}R_xSc_y)_3(Al_{1-z}Sc_z)_5O_{12} \quad (1)$$

wherein R is yttrium and/or lutetium, $0.05 \le x < 0.45$, $0 < y < 0.1$, $0.5 < 1-x-y < 0.95$, and $0.004 < z < 0.2$.

Herein, the composition of the complex oxide (garnet-type rare earth complex oxide) powder targeted in the present invention is represented by the above formula (1). Note that, in the garnet crystal structure represented by the formula (1), the site mainly occupied by Tb, that is, the former parentheses in the formula (1) is referred to as an A site, and the site mainly occupied by Al, that is, the latter parentheses in the formula (1) is referred to as a B site.

In the A site of the formula (1), terbium (Tb) is the element having the greatest Verdet constant among the trivalent rare earth ions and is the element most suitable to be used as a material for an optical isolator at a wavelength region of 1,064 nm since the absorption is extremely small in this wavelength region used by a fiber laser. However, Tb (III) ions are easily oxidized to generate Tb (IV) ions. If the Tb (IV) ions are generated in metal oxide, light with a wide range of wavelengths from ultraviolet to near infrared is absorbed. Thus, it is desirable to eliminate the Tb (IV) ions as much as possible. As one of the strategies of not generating Tb (IV) ions, it is effective to employ a crystal structure in which the Tb (IV) ions are unstable, that is, a garnet structure.

In the A site of the formula (1), R is yttrium (Y) and/or lutetium (Lu), preferably Y or Lu, and more preferably Y.

Moreover, in the B site of the formula (1), aluminum (Al) is the material having the shortest ionic radius among trivalent ions that can stably exist in oxide having a garnet structure, and is the element that can minimize the lattice constant of the Tb-containing paramagnetic garnet-type oxide. If the lattice constant of the garnet structure can be decreased without changing the Tb content, the Verdet constant per unit length can be increased, which is preferable. Furthermore, since aluminum is a light metal, the diamagnetism thereof is weaker than that of gallium, and the effect of relatively increasing the magnetic flux density occurring inside the Faraday rotator is expected. This is also preferable because the Verdet constant per unit length can be increased. The Verdet constant of the actual TAG ceramic is improved to 1.25 to 1.5 times that of a TGG. Therefore, even when a relative concentration of terbium is lowered by substituting the above R ions for some of the terbium ions, the Verdet constant per unit length can be kept equal to or slightly lower than that of the TGG. Thus, these are constituent elements suitable in the present invention.

Herein, the complex oxide containing only the constituent elements of Tb, R (Y and/or Lu) and Al may not have a garnet structure due to a slight weighing error, and it is difficult to stably produce a transparent ceramic usable for optical applications. Therefore, in the present invention, scandium (Sc) is added as a constituent element to eliminate compositional deviation due to a slight weighing error. Sc is a material that has an intermediate ionic radius and can be solid solution in both the A site and the B site in the oxide having a garnet structure. Sc is also a buffer material that can be solid solution by adjusting the distribution ratio thereof to the A site (rare earth site composed of Tb and R) and the B site (aluminum site) so as to exactly match the stoichiometric ratio and thereby minimize the generation energy of the crystallite when the compounding ratio of the rare earth elements of Tb and R to Al is deviated from the stoichiometric ratio due to variation at the time of weighing. Sc is also an element that can limit the abundance of the alumina different phase in the garnet parent phase to 1 ppm or less and limit the abundance of the perovskite-type different phase in the garnet parent phase to 1 ppm or less. Thus, Sc is an indispensable element in the present invention.

In the formula (1), the range of x is $0.05 \le x < 0.45$, preferably $0.1 \le x \le 0.4$, and more preferably $0.2 \le x \le 0.35$. If x is in this range, the perovskite-type different phase can be reduced to a level that cannot be detected by X-ray diffraction (XRD) analysis. Furthermore, the abundance of the perovskite-type different phase (which have a typical type size of 1 μm to 1.5 μm in diameter and are granular appearing to be colored by light brown) in a viewing field of 150 μm×150 μm by optical microscope observation is one or less, which is preferable. The abundance of the perovskite-type different phase at this time in the garnet parent phase is 1 ppm or less. Similarly, if x is in the above range, the amount of pores (which have a typical size of 0.5 μm to 2.0 μm in diameter and become spherical gaps when subjected to HIP treatment) remaining in the ceramic sintered body in a viewing field of 150 μm×150 μm by optical microscope observation is one or less in abundance, which is preferable. The abundance of the pores at this time in the garnet parent phase is 1 ppm or less.

When x is less than 0.05, the effect of substituting R (Y and/or Lu) for some of Tb cannot be obtained, and this is not substantially different from the conditions for creating the TAG. Thus, it becomes difficult to stably produce a high-quality ceramic sintered body with low scattering and low absorption, which is unpreferable. Moreover, when x is 0.45 or more, the Verdet constant at a wavelength of 1,064 nm becomes less than 30 Rad/(T·m), which is unpreferable. Furthermore, if the relative concentration of Tb is excessively diluted, the overall length necessary to rotate laser light with a wavelength of 1,064 nm by 45 degrees becomes long, exceeding 30 mm, when a general magnet is used. This makes the production difficult, which is unpreferable.

In the formula (1), the range of y is $0 < y < 0.1$, preferably $0 < y < 0.08$, more preferably $0.002 \le y \le 0.07$, and still more preferably $0.003 \le y \le 0.06$. If y is in this range, the perovskite-type different phase can be reduced to a level that cannot be detected by X-ray diffraction (XRD) analysis. Furthermore, the abundance of the perovskite-type different phase (which have a typical type size of 1 μm to 1.5 μm in diameter and are granular appearing to be colored by light brown) in a viewing field of 150 μm×150 μm by optical microscope observation is one or less, which is preferable. The abundance of the perovskite-type different phase at this time in the garnet parent phase is 1 ppm or less.

When y=0, the perovskite-type different phase is highly likely to precipitate, which is unpreferable. Moreover, when y is 0.1 or more, R is substituted for some of Tb, and further Sc is substituted for some of Tb while the effect of suppressing the precipitation of the perovskite-type different phase is saturated and unchanged. As a result, the solid solution concentration of Tb is unnecessarily lowered, thereby decreasing the Verdet constant. This is unpreferable. Furthermore, Sc is expensive as a raw material, so unnecessary excessive doping of Sc is unpreferable from the viewpoint of the production costs.

In the formula (1), the range of 1-x-y is $0.5<1-x-y<0.95$, preferably $0.55<1-x-y<0.95$, and more preferably $0.6\le 1-x-y<0.95$. If 1-x-y is in this range, a large Verdet constant can be secured as well as high transparency can be obtained at a wavelength of 1,064 nm.

In the formula (1), the range of z is $0.004<z<0.2$, preferably $0.004<z<0.16$, more preferably $0.01\le z\le 0.15$, and still more preferably $0.03\le z\le 0.15$. If z is in this range, the perovskite-type different phase cannot be detected by XRD analysis. Furthermore, the abundance of the perovskite-type different phase (which have a typical type size of 1 µm to 1.5 µm in diameter and are granular appearing to be colored by light brown) in a viewing field of 150 µm×150 µm by optical microscope observation is one or less, which is preferable. The abundance of the perovskite-type different phase at this time in the garnet parent phase is 1 ppm or less.

When z is 0.004 or less, the perovskite-type different phase is highly likely to precipitate, which is unpreferable. Moreover, when z is 0.2 or more, the value of y, that is, the substitution ratio of Sc for Tb also increases in conjunction with the increase in the value of z while the effect of suppressing the precipitation of the perovskite-type different phase is saturated and unchanged. As a result, the solid solution concentration of Tb is unnecessarily lowered, thereby decreasing the Verdet constant. This is unpreferable. Furthermore, Sc is expensive as a raw material, so unnecessary excessive doping of Sc is unpreferable from the viewpoint of the production costs.

A process for creating the sinterable raw material powder of the complex oxide used in the present invention is not particularly limited, but a coprecipitation method, a crushing method, a spray-pyrolysis method, a sol-gel method, an alkoxide hydrolysis method, or any other synthesis method may be used. In some cases, the ceramic raw material of the resulting rare earth complex oxide may be treated by a wet ball mill, a bead mill, a jet mill, a dry jet mill, a hammer mill or the like as appropriate in order to obtain a desired grain size. For example, the sinterable raw material powder may be made by using a solid phase reaction method, in which a plurality of kinds of oxide particles are mixed and fired and uniformity is created by thermal diffusion of ions, or a coprecipitation method, in which hydroxide, carbonate or the like is precipitated from an ion-containing solution, in which oxide particles are dissolved, and fired to generate oxide.

In a case of the solid phase reaction method in which a plurality of kinds of oxide particles are mixed and fired and uniformity is created by thermal diffusion of ions, metal powder composed of terbium, yttrium and/or lutetium, scandium and aluminum, an aqueous solution of nitric acid, sulfuric acid, uric acid or the like, oxide powder of the above elements, or the like can be suitably utilized as a starting material. Moreover, the purity of the raw material is preferably 99.9% by weight or more, and particularly preferably 99.99% by weight or more.

Predetermined amounts of these starting materials are weighed so as to become the composition corresponding to the formula (1), mixed and then fired to obtain a fired raw material mainly composed of cubic garnet-type oxide having desired composition. At this time, to become a garnet structure, the firing temperature is a temperature of preferably 950° C. or more and lower than the sintering temperature for the step performed thereafter, and more preferably a temperature of 1,100° C. or more and lower than the sintering temperature for the step performed thereafter. The firing time may be one hour or longer, and the rate of temperature increase at that time is preferably 100° C./h or more and 500° C./h or less. The firing atmosphere is preferably an oxygen-containing atmosphere of atmospheric oxygen, and a nitrogen atmosphere, an argon atmosphere, a hydrogen atmosphere, or the like is unsuitable. Furthermore, the firing furnaces and kiln are exemplified by a vertical muffle furnace, a horizontal tubular furnace, a rotary kiln and the like, and are not particularly limited as long as the target temperature can be reached and an oxygen flow can be created. Note that "mainly composed of" as used herein indicates that the main peak obtained from the powder X-ray diffraction result of the fired raw material is of a diffraction peak derived from the garnet structure. Note that, when the abundance of the perovskite-type different phase in the garnet parent phase is 1 ppm or less, substantially only the garnet single phase pattern is detected for the powder X-ray diffraction patterns.

Further, the fired raw material should be obtained by mixing the starting materials and a solvent with an addition of an additive, such as a dispersant, to prepare a slurry, granulating the slurry by spray-drying, and firing the resulting granules.

Next, the resulting fired raw material is crushed into sinterable raw material powder.

Herein, the fired raw material obtained as described above is slurried by any of various crushing (dispersing) methods using a ball mill, a bead mill, a homogenizer, a jet mill, ultrasonic irradiation or the like, and crushed (dispersed) to primary particles. The dispersion medium of this wet slurry is not particularly limited as long as the finally resulting ceramic can be highly transparentized, and examples thereof include alcohols, such as lower alcohols having 1 to 4 carbon atoms, and pure water. This wet slurry may be directly used for the preparation of a raw material powder slurry described later. For example, a necessary organic additive, such as a binder, is added to this wet slurry and mixed to prepare the raw material powder slurry.

Moreover, the sinterable raw material powder preferably contains a sintering aid. For example, the above starting materials as well as tetraethoxysilane (TEOS) as a sintering aid are added in an $SiO_2$ conversion amount of more than 0 ppm to 1,000 ppm or less (more than 0% by weight to 0.1% by weight or less) in the entire raw material powder (garnet-type complex oxide powder+sintering aid), or $SiO_2$ powder is added in an amount of more than 0 ppm to 1,000 ppm or less (more than 0% by weight to 0.1% by weight or less) in the entire raw material powder (garnet-type complex oxide powder+sintering aid) is added, mixed and fired to prepare the fired raw material. If the addition amount exceeds 1,000 ppm, a slight amount of light absorption may occur due to crystal defects by Si excessively contained. Note that the purity thereof is preferably 99.9% by weight or more. The sintering aid may be added at the time of preparing the raw material powder slurry described later.

Furthermore, when a sintering aid is not added, one which has the primary particles with a nano particle size and extremely high sintering activity should be selected for the sinterable raw material powder to be used (i.e., the above complex oxide powder). Such selection may be made as appropriate.

Centrifugal Casting Step

In the present invention, a slurry or slip, which is composed of a dispersion medium and a dispersoid prepared by using the sinterable raw material powder created as described above, is enclosed in a mold container and subjected to solid-liquid separation by centrifugal casting to mold a cast compact. Specifically, the centrifugal casting is performed as below.

<Preparation of Raw Material Powder Slurry>

In the present invention, the raw material powder slurry, which is composed of a dispersion medium and a dispersoid containing the above sinterable raw material powder, is prepared. For example, the dispersoid containing the above sinterable raw material powder is added to the dispersion medium, subjected to dispersing and mixing treatments to obtain the raw material powder slurry.

Herein, the type of dispersion medium is not particularly designated, but water (pure water) and/or a lower alcohol having 1 to 4 carbon atoms, or the like can be suitably utilized. Examples of the types of the alcohol include lower alcohols such as methanol, ethanol, propanol, isopropanol and butanol.

Moreover, the method of preparing the raw material powder slurry is not particularly limited, and a wet ball mill, a bead mill, a jet mill, a homogenizer, and the like can be suitably utilized.

At this time, various kinds of organic additives may be added to the raw material powder slurry used in the present invention for the purpose of quality stability and yield improvement in the ceramic production steps including the centrifugal casting step after the addition. In the present invention, these are also not particularly limited. That is, various dispersants, organic binders (hereinafter simply referred to as binders), lubricants, plasticizers and the like for improving the dispersion stability and the like of the slurry can be suitably utilized. However, for these organic additives, it is preferable to select a high-purity type free of unnecessary metal ions.

For example, the binders aim at improving the shape retention of the compact, the type thereof is not particularly limited, and polyvinyl alcohol, vinyl acetate and copolymers thereof, polyvinyl butyral, acrylic resin, methyl cellulose, and the like can be suitably utilized. The addition amount of the binder may be adjusted as appropriate in consideration of the shape retention of the compact.

<Enclosure of Raw Material Powder Slurry or Slip>

The raw material powder slurry prepared as described above is enclosed in a centrifuge tube, which is a mold container. Alternatively, there may be a step of allowing the prepared raw material powder slurry to be left for a while before being packed in the centrifuge tube, which is a mold container. That is, the raw material powder slurry, which is composed of the dispersion medium and the dispersoid containing the sinterable raw material powder, is allowed to stand for a predetermined time (e.g., 12 to 72 hours), the supernatant liquid (part of the dispersion medium) is discarded to obtain a sediment of the dispersoid and the remaining dispersion medium, and this sediment may be enclosed in the mold container as the slip.

The centrifuge tube, which is the mold container, is preferably a cylindrical container, the dimensions and material thereof are not particularly limited as long as the centrifuge tube can be set in a centrifuge, and glass, resin, metal, and the like can be suitably utilized.

Herein, the centrifugal casting may be performed by directly using the mold container in which the raw material powder slurry or slip is thus enclosed (i.e., without performing a preliminary centrifugation treatment described later).

Note that the centrifugal casting method performed thereafter is an excellent molding method, but the size of the compact depends on the size of the centrifuge and depends greatly on the dimensions of the centrifuge tube in particular. For example, when a test tube shaped (cylindrical) centrifuge tube is used, the diameter of the cast compact depends on the diameter of the centrifuge tube, and the length of the compact depends on the length of the centrifuge tube. Centrifuge tubes with a variety of diameters are commercially available, and it is also possible to self-make a centrifuge tube with any diameter as necessary. Herein, as the length of the centrifuge tube is lengthened, the amount of the raw material powder slurry or slip that can be enclosed can be increased. However, as it is, the centrifugal force is weakened in the vicinity of the rotation center of the rotor so that a satisfactory centrifugal force cannot be obtained in the corresponding position of the centrifuge tube. For that reason, a satisfactory cast compact cannot be obtained. Therefore, if it is attempted to obtain a sufficient centrifugal force in the vicinity of the rotation center of the rotor, the centrifugal force at the bottom of the centrifuge tube becomes excessively large in turn, and the centrifugal tube may be damaged. That is, the length of the cast compact was restricted.

For example, the Verdet constant of the TGG is 40 Rad/(T·m), and those processed to have an optical path length of 20 mm are generally in the market. When a Faraday rotator whose Verdet constant is less than that of the TGG, employed is a method of enlarging the magnetic shape to increase the magnetic flux density applied to the Faraday rotator in order to maintain 45° rotation, or a method of lengthening the length of the Faraday rotator. When the magnet is enlarged, there is a dimensional restriction in the device, and the leakage magnetic field also becomes large. Thus, this is difficult to handle. Therefore, a long Faraday rotator is desired, but the length of the Faraday rotator which can be produced as described above was restricted in the conventional centrifugal casting method.

In the present invention, the following preliminary centrifugation treatment is performed, and a centrifugal cast compact with a length, which was difficult to produce by the conventional centrifugal casting method, has been realized.

<Preliminary Centrifugation Treatment>

It is preferable to perform the following treatment at least once before subjecting to centrifugal casting: the treatment comprises the steps of subjecting the mold container with the slurry or slip to preliminary centrifugation treatment to separate and remove some of the dispersion medium from the slurry or slip thereby concentrating the dispersoid in it; and further enclosing the additional slurry or slip prepared as above into the mold container. Specifically, this should be done with the following procedure.

Step S1

Set the mold container, in which the raw material powder slurry or slip is enclosed, in a centrifuge.

The centrifuge may be the same device used for performing the centrifugal casting. Moreover, the rotor mounted in the centrifuge is not particularly limited, but a swing rotor can be suitably utilized.

Step S2

Next, perform the centrifugation treatment with a centrifugal force weaker than the centrifugal force at the time of centrifugal casting finally performed. At this time, the centrifugation should be performed such that the longitudinal direction of the mold container is in the centrifugal direction.

The centrifugal force at this time is preferably 300 to 1,000 G, and more preferably 500 to 750 G. In the sediment which will be obtained if the centrifugal force is in the above range, the dispersoid containing the sinterable raw material powder is concentrated as well as a certain amount or more of the dispersion medium remains in the sediment. Thus, the fluidity of the sediment is kept. Therefore, it is possible to remove this separated dispersion medium and further add the raw material powder slurry or slip into the mold container so that the cast compact, which is longer than the compact obtained by packing the raw material powder slurry or slip once in the mold container, is obtained. Furthermore, since the sediment (concentrated slip) left in the mold container has fluidity to some extent, it is possible to mix to some extent at the interface between this sediment and the next added raw material powder slurry or slip. Thus, an integrated cast compact is obtained after the centrifugal casting. Note that, with the centrifugal force less than 300 G, the dispersion medium may be hardly separated from the enclosed raw material powder slurry or slip so that the dispersoid cannot be concentrated. With the centrifugal force exceeding 1,000 G, the dispersion medium may be too separated and solidified so that the mixing at the interface between this sediment and the next added raw material powder slurry or slip cannot be progressed. Thus, the integrated cast compact may not be obtained.

Note that, in the present invention, when the centrifugal force (G) is the centrifugal force at the bottom of the centrifuge tube, that is, the maximum centrifugal force, the maximum radius of the rotor of the centrifuge (distance between the rotation center of the centrifuge rotor and the bottom of the centrifuge tube during the centrifugation) is r (m), the rotation speed during the preliminary centrifugation (or during the centrifugal casting) is N (rpm), and the gravitational acceleration is g (m/s$^2$), r×(2πN/60)$^2$/g is defined (hereinafter the same applies to the centrifugal casting).

Moreover, the treatment time is preferably 1 to 15 minutes, and more preferably 3 to 10 minutes. When the treatment time is shorter than one minute, the moving distance of the slip is insufficient so that the effect of the concentration may not be sufficiently obtained. In addition, when the treatment time is longer than 15 minutes, the slip has too high concentration and is solidified, and the fluidity of the precipitate may be lowered.

Therefore, the raw material powder slurry or slip enclosed in the mold container is thus separated into a sediment (a solid: on the bottom side (the centrifugal direction side) in the mold container) and part of the dispersion medium (liquid: the supernatant liquid in the mold container), and the dispersoid is concentrated while the fluidity of the precipitate is kept to some extent.

Step S3

Remove part of the dispersion medium separated in the mold container, and add and enclose the aforementioned prepared slurry or slip into the mold container.

At this time, the interface between the sediment and the added slurry or slip in the mold container should be stirred and mixed to be enclosed. Specifically, the above interface may be mixed by stirring with a stirring rod, or ultrasonic vibration may be applied to the entire mold container to stir and mix the interface. This is preferable because the sediment and the added slurry or slip in the mold container are likely to be integrated at the end as a cast compact.

It is preferable to perform one set of these procedures of steps S1 to S3 at least once. As these procedures are repeated, the length of the resulting centrifugal cast compact is lengthened. However, since the lengthening rate of the length tends to decrease, the number of executions should be set according to the length of the mold container as well as the target length of the final transparent ceramic. For example, the number of executions is preferably one to five times, and more preferably one to four times.

<Centrifugal Casting (Centrifugation)>

The centrifugal casting is performed by using the mold container in which the raw material powder slurry or slip is enclosed as described above or the mold container subjected to the preliminary centrifugation treatment, and the contents (the raw material slurry or slip, or the sediment and the raw material slurry or slip in the case of the preliminary centrifugation treatment) of the mold container is subjected to the solid-liquid separation to mold the cast compact (centrifugal cast compact).

The rotor mounted in the centrifuge is not particularly limited, but a swing rotor can be suitably utilized as in the preliminary centrifugation treatment. At this time, the centrifugation should be performed such that the longitudinal direction of the mold container is in the centrifugal direction.

The density of the cast compact created by the centrifugal casting method greatly depends on the centrifugal force applied to the contents (the raw material slurry or slip, or the sediment and the raw material slurry or slip in the case of the preliminary centrifugation treatment) of the mold container. Therefore, the centrifugal force must be a centrifugal force which can result in sufficient densification (relative density ≤94%) in the subsequent sintering step to obtain the dense compact.

Specifically, the centrifugal force applied to the contents of the mold container is preferably 1,500 G to 5,000 G, more preferably 2,000 G to 4,000 G, and still more preferably 2,500 G to 3,500 G. If the centrifugal force is less than 1,500 G, not only the depression time (treatment time) becomes unnecessarily long, but also the density of the sediment (compact) decreases, and the occurrence frequency of cracks in the compact is increased in the subsequent drying step. Moreover, if the centrifugal force exceeds 5,000 G, depending on the packing amount of the slurry or slip, the centrifuge tube cannot withstand the load depending on the material thereof, and the container may be damaged. The centrifugal force may be adjusted as appropriate in consideration of the occurrence frequency of the cracks and the state of densification of the sintered body.

Furthermore, the treatment time is preferably 15 to 120 minutes, and more preferably 30 to 90 minutes. When the treatment time is shorter than 15 minutes, the moving distance of the dispersoid is insufficient so that the dense compact may not be obtained. In addition, when the treatment time is longer than 120 minutes, a sufficient compact density has already been reached so that further improvement may not be expected.

In the production process of the present invention, a certain rotation speed may be kept until the densification of the compact is completed. Moreover, the speeds of the acceleration and deceleration of the rotor are not particularly limited. Furthermore, the supernatant (dispersion medium) generated by the centrifugation may be removed as appropriate.

Drying Step

In the production process of the present invention, a common drying step can be suitably utilized. That is, natural drying, heat drying, reduced pressure drying, freeze drying and the like can be suitably utilized. Although the drying rate can be increased by heating or depressurizing, sudden drying may cause cracks in the compact. Thus, it is necessary to adjust the drying rate as appropriate. The compact should be dried in the mold container. For example, the compact is preferably dried at room temperature to 110° C. for one to four days, and more preferably at 40 to 75° C. for two to four days to obtain a cast dried compact composed of the raw material powder.

The dried compact is removed from the mold container.

The shape of the cast dried compact corresponds to the shape of the target sintered body and is, for example, a cylindrical shape with a diameter of 10 to 60 mm and a length of 5 to 40 mm.

The transparent ceramic is produced as below by using this cast dried compact.

Degreasing Step

In the production process of the present invention, a common degreasing step can be suitably utilized. That is, it is possible to undergo a temperature rising degreasing step using a common heating furnace. Moreover, the type of the atmosphere gas at this time is also not particularly limited, and air, oxygen, oxygen-containing mixed gas, and the like can be suitably utilized. The degreasing temperature is also not particularly limited. However, when a raw material mixed with an organic additive is used, it is preferable to raise the temperature to a temperature at which the organic component can be decomposed and eliminated.

Sintering Step

In the production process of the present invention, a common sintering step can be suitably utilized. That is, a heat sintering step, such as a resistance heating method and an induction heating method, can be suitably utilized. The atmosphere at this time is not particularly limited, and it is possible to sinter under various atmospheres of inert gas, oxygen gas, hydrogen gas, helium gas, and the like, or also under reduced pressure (in vacuum). However, since it is preferable to prevent the occurrence of oxygen deficiency at the end, oxygen gas atmosphere and reduced pressure oxygen gas atmosphere are exemplified as more preferable atmospheres.

The sintering temperature in the sintering step of the present invention is preferably 1,500 to 1,780° C., and particularly preferably 1,550 to 1,750° C. When the sintering temperature is in this range, densification is promoted while the precipitation of different phases is suppressed, which is preferable.

The sintering retention time in the sintering step of the present invention is sufficient for about several hours, but the relative density of the sintered body must be densified to at least 95% or more. When the sintering retention time is long, ten hours or longer, and the relative density of the sintered body is densified to 99% or more, the final transparency is improved, which is more preferable.

Hot Isostatic Pressing (HIP) Step

In the production process of the present invention, it is possible to further provide an additional hot isostatic pressing (HIP) treatment step after the sintering step.

Note that, as for the type of the pressurized gas medium at this time, inert gas such as argon and nitrogen, or $Ar-O_2$ can be suitably utilized. The pressure applied by the pressurized gas medium is preferably 50 to 300 MPa, and more preferably 100 to 300 MPa. If the pressure is less than 50 MPa, the transparency improving effect may not be obtained. If the pressure exceeds 300 MPa, no further transparency improvement is obtained even when the pressure is increased. Moreover, the load applied to the device becomes excessive, and the device may be damaged. It is convenient and preferable that the applied pressure be 196 MPa or less, which can be handled by a commercially available HIP device.

Moreover, the treatment temperature (predetermined retention temperature) at that time is set within the range from 1,000 to 1,780° C., and preferably from 1,100 to 1,730° C. If the heat treatment temperature exceeds 1,780° C., oxygen deficiency is likely to occur, which is unpreferable. In addition, if the heat treatment temperature is less than 1,000° C., the effect of improving transparency of the sintered body is hardly obtained. Note that the retention time of the heat treatment temperature is not particularly limited. However, if the heat treatment temperature is retained for a long time, oxygen deficiency is likely to occur, which is unpreferable. Typically, the retention time is preferably set within the range from one to three hours.

Note that the heater material, the heat insulating material and the treatment container subjected to the HIP treatment are not particularly limited, but graphite, or molybdenum (Mo), tungsten (W), platinum (Pt) can be suitably utilized, and yttrium oxide, gadolinium oxide can also be further suitably utilized as the treatment container. When the treatment temperature is 1,500° C. or less in particular, platinum (Pt) can be used as the heater material, the heat insulating material and the treatment container, and the pressurized gas medium can be $Ar-O_2$. Thus, the occurrence of oxygen deficiency during the HIP treatment can be prevented, which is preferable. When the treatment temperature exceeds 1,500° C., graphite is preferable as the heater material and the heat insulating material. In this case, one of graphite, molybdenum (Mo) or tungsten (W) is selected as the treatment container, and one of yttrium oxide or gadolinium oxide is selected as a double container inside the treatment container. Then, if an oxygen release material is packed in the container, the occurrence amount of oxygen deficiency during the HIP treatment can be suppressed to the minimum, which is preferable.

Oxidation Annealing Step

In the production process of the present invention, oxygen deficiency occurs in the resulting transparent ceramic sintered body after the HIP treatment is finished, and the transparent ceramic sintered body may exhibit a subtle light gray appearance. In that case, it is preferable to perform oxygen annealing treatment (oxygen deficiency recovery treatment) under an oxygen atmosphere at the HIP treatment temperature or less, typically 1,000 to 1,500° C. The retention time in this case is not particularly limited, but is preferably selected within a time period which is not less than a time sufficient for oxygen deficiency to recover and does not waste oxygen gas and electricity cost due to unnecessarily long treatment. By this oxygen annealing treatment, even the transparent ceramic sintered bodies, which have exhibited a subtle light gray appearance by the HIP treatment step, can be all paramagnetic garnet-type transparent ceramic bodies without absorption caused by oxygen deficiency.

Optical Polishing

In the production process of the present invention, it is preferable to optically polish both end faces, which are on the optically utilizing axis, of the paramagnetic garnet-type transparent ceramic that has undergone the above series of production steps. The optical surface accuracy at this time is preferably $\lambda/2$ or less and particularly preferably $\lambda/8$ or less, when the measurement wavelength $\lambda=633$ nm. Note that the optical loss can be further reduced by forming antireflection films as appropriate on the optically polished surfaces.

As described above, it is possible to provide a transparent ceramic that is the paramagnetic garnet-type oxide containing terbium, yttrium and/or lutetium and has a total light transmittance of 99% or more at a wavelength of 1,064 nm for a length (optical path length) of 17 to 25 mm. Note that, in the present invention, the "total light transmittance"

means the total light transmittance when the transmittance measured in the blank (space) state without placing a sample in the measurement optical path is set as 100%, and the sample is in a state of being coated with an antireflection film designed to have the center wavelength of 1,064 nm.

Moreover, according to the production process of the present invention, it is possible to obtain a transparent ceramic having an extinction ratio of 40 dB or more at a wavelength of 1,064 nm for an optical path length of 17 to 25 mm, which is measured in accordance with the polarizer test method of JIS C5877-2: 2012.

Magneto-Optical Device

Furthermore, since the paramagnetic garnet-type transparent ceramic material according to the present invention is presumed to be utilized as a magneto-optical material, it is preferable to apply a magnetic field to the transparent ceramic material parallel to the optic axis thereof and then set a polarizer and an analyzer such that their optical axes are shifted from each other by 45 degrees, thereby constituting a magneto-optical device to be utilized. That is, the magneto-optical material according to the present invention is suitable for magneto-optical device applications and is suitably used as a Faraday rotator of an optical isolator at a wavelength of 0.9 to 1.1 μm in particular.

Figure 1:
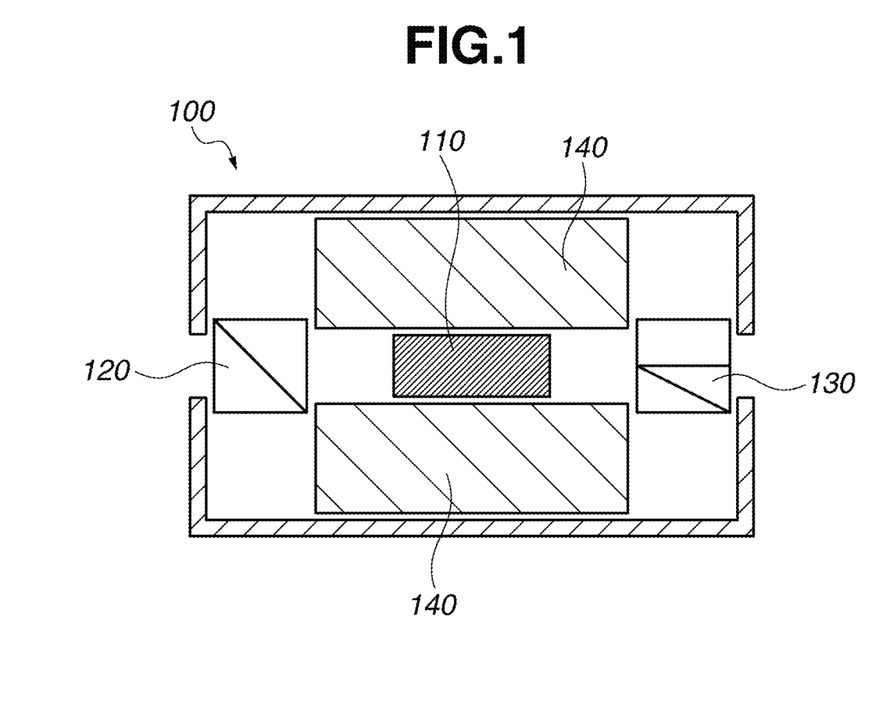
FIG. 1 is a schematic cross-sectional view showing a configuration example of an optical isolator using a transparent ceramic material manufactured by the present invention as a Faraday rotator.

FIG. 1 is a schematic cross-sectional view showing one example of an optical isolator which is an optical device having, as an optical element, a Faraday rotator made of the transparent ceramic material produced by the production process of the present invention. In FIG. 1, an optical isolator 100 includes a Faraday rotator 110 made of the transparent ceramic material produced according to the present invention, and a polarizer 120 and an analyzer 130, which are polarization materials, are provided in front of and behind the Faraday rotator 110, respectively. Further, in the optical isolator 100, it is preferable that the polarizer 120, the Faraday rotator 110 and the analyzer 130 be disposed in this order, and a magnet 140 be placed on at least one of the side faces thereof.

In addition, the above optical isolator 100 can be suitably utilized for industrial fiber laser devices. That is, the optical isolator 100 is suitable to prevent the reflected light of the laser light emitted from a laser light source from returning to the light source to cause unstable oscillation.

EXAMPLES

Hereinafter, the present invention is more specifically described with Examples, Comparative Examples and Test Examples, but the present invention is not limited to these Examples.

Examples 1 to 3

Example 1

Terbium oxide powder, yttrium oxide powder, scandium oxide powder manufactured by Shin-Etsu Chemical Co., Ltd., and aluminum oxide powder manufactured by Taimei Chemical Co., Ltd. were obtained. Moreover, tetraethyl orthosilicate (TEOS) manufactured by Kishida Chemical Co., Ltd. and a liquid of polyethylene glycol 200 manufactured by Kanto Chemical Co., Inc. were obtained. The purity was 99.95% by weight or more for all the powder raw materials and 99.999% by weight or more for the liquid raw material. Oxide Raw Material No. 1 was created as below by adjusting the mixing ratio of the above starting materials so as to obtain the final composition shown in Table 1.

(Oxide Raw Material No. 1)

Mixed powder for $(Tb_{0.598}Y_{0.398}S_{0.004})_3(Al_{0.97}Sc_{0.03})_5O_{12}$ was prepared by weighing so that the numbers of moles of terbium, yttrium, aluminum and scandium are Tb:Y:Sc:Al=1.794:1.194:0.162:4.850, respectively. Subsequently, TEOS as a sintering aid was weighed so that the addition amount thereof was 100 ppm in $SiO_2$ conversion, and added to obtain Oxide Raw Material No. 1.

Next, the resulting Oxide Raw Material No. 1 was put in a polyethylene pot, and polyethylene glycol 200 as a dispersant was added so as to be 0.5% by weight per the oxide raw material. Next, dispersion and mixing treatment was performed in ethanol in a ball mill device. The treatment time was 24 hours. Thereafter, a spray-drying treatment was performed to create a granular raw material with an average grain size of 20 μm.

Subsequently, the resulting granular raw material was put in an yttria crucible and subjected to firing treatment in a high-temperature muffle furnace at 1,100° C. for a retention time of three hours to obtain a fired raw material powder. Next, this fired raw material powder was divided into two portions. One portions of fired raw material powder was used to perform centrifugal casting (Example 1), the other portion was used to perform pressing (Comparative Example 1).

Centrifugal Casting

Centrifugal casting was performed as Example 1. The fired raw material powder was put in a polyethylene pot, and polyethylene glycol 200 as a dispersant was added so as to be 0.5% by weight per the fired raw material powder. Then, dispersion and mixing treatment were performed in ethanol in a ball mill device to obtain a wet slurry. The treatment time was 24 hours.

An ethanol suspension containing a partial saponified form of polyvinyl acetate as a binder was added to the resulting wet slurry. As the shape retention of the compact was checked, the addition amount of the binder was adjusted as appropriate to be 5% by weight per the weight of the metal oxide (fired raw material powder). This slurry was subjected mixing treatment again in the ball mill device for three hours to obtain a raw material powder slurry. The raw material powder slurry, from which the balls were separated, was transferred to a beaker and allowed to stand for 24 hours to form a sediment where the metal oxide particles are deposited, and the supernatant liquid was removed to obtain a slip.

Next, 16 mL of the slip, which corresponds to the above Oxide Raw Material No. 1, was packed in a polypropylene round bottom centrifuge tube (inner diameter: 14 mmφ, length: 150 mm, maximum volume: 16 mL), and then the preliminary centrifugation treatment of steps S11 to S14 below was performed with the number of executions of two.

Step S11

Set the round bottom centrifuge tube in a centrifuge (Universal Refrigerated Centrifuge Model 5930 manufactured by KUBOTA Corporation) equipped with a swing rotor (ST-2504MS manufactured by KUBOTA Corporation).

Step S12

Perform the preliminary centrifugation treatment for five minutes with the maximum centrifugal force of 500 G.

Step S13

After the completion of the centrifugation, remove the supernatant in the round bottom centrifuge tube, and add the slip again so as to make the volume 16 mL.

Step S14

Stir the interface between the sediment and the added slip in the round bottom centrifuge tube with a microspatula to mix and homogenize.

Next, the round bottom centrifuge tube after the preliminary centrifugation treatment was set in the same centrifuge, and the centrifugal casting was performed for 60 minutes with the maximum centrifugal force of 2,500 G.

After the centrifugal casting, the supernatant in the round bottom centrifuge tube was removed, and the solvent was naturally dried to obtain a cast dried compact.

Pressing

Pressing was performed as Comparative Example 1. That is, the aforementioned fired raw material powder was first subjected to dispersion and mixing treatment again in ethanol in a ball mill device. The treatment time was 24 hours. Next, a spray-drying treatment was performed to create a granular raw material with an average grain size of 20 μm. Using the resulting granular raw material, uniaxial pressing and isostatic pressing (CIP) treatment with a pressure of 198 MPa were carried out to obtain a press compact with substantially the same shape and the same dimensions as the above cast dried compact.

The resulting cast dried compact and press compact were subjected to degreasing treatment by retention for 24 hours at 800° C. in a muffle furnace. Subsequently, the degreased compact was placed in a vacuum furnace and treated for three hours at 1,600° C. Each resulting sintered body was placed in a carbon heater HIP furnace and subjected to HIP treatment under the conditions of Ar, 200 MPa, 1,700° C., and two hours.

Then, the HIP-treated sintered bodies were again placed in an oxygen atmosphere furnace and subjected to oxidation treatment under the conditions of 1,300° C. and six hours.

Each of the transparent ceramics thus obtained was subjected to cylindrical grinding to a diameter of 5 mm, and both end faces were each polished to a length that the polarization plane rotates by 45°, presuming that a magnetic flux density of 1.6 T is applied to the Faraday rotator. That is, the transparent ceramic of $(Tb_{0.598}Y_{0.398}Sc_{0.004})_3(Al_{0.97}Sc_{0.03})_5O_{12}$ in this Example was subjected to grinding and polishing treatments so as to have a length of 24 mm. Moreover, both optical end faces of each sample were subjected to final optical polishing to an optical surface accuracy of λ/8 (in the case of measurement wavelength λ=633 nm).

Subsequently, the above optically polished sample was coated with an antireflection film designed to have a center wavelength of 1,064 nm to obtain an evaluation sample.

Example 2

The oxide raw material in Example 1 was changed to Oxide Raw Material No. 2 below, and the centrifugal casting conditions were set as below. Other than that, an evaluation sample was created under the same conditions as Example 1. Note that the final length of the transparent ceramic is the length that the polarization plane rotates by 45°, presuming that a magnetic flux density of 1.6 T is applied to the Faraday rotator, and is 20 mm in this Example $((Tb_{0.697}Y_{0.299}Sc_{0.004})_3(Al_{0.97}Sc_{0.03})_5O_{12})$.

(Oxide Raw Material No. 2)

Mixed powder for $(Tb_{0.697}Y_{0.299}Sc_{0.004})_3(Al_{0.97}Sc_{0.03})_5O_{12}$ was prepared by weighing so that the numbers of moles of terbium, yttrium, aluminum and scandium are Tb:Y:Sc:Al=2.091:0.897:0.162:4.850, respectively. Subsequently, TEOS as a sintering aid was weighed so that the addition amount thereof was 100 ppm in $SiO_2$ conversion, and added to obtain Oxide Raw Material No. 2.

Centrifugal Casting

Using Oxide Raw Material No. 2, the preliminary centrifugation treatment of steps S11 to S14 in Example 1 was performed once (i.e., the number of executions: one), and other conditions were the same as those of Example 1 to obtain a cast dried compact.

In addition, the oxide raw material in Comparative Example 1 was changed to Oxide Raw Material No. 2 below. Other than that, an evaluation sample (Comparative Example 2) was created under the same conditions as Comparative Example 1. Note that the final length of the transparent ceramic in this Comparative Example is 20 mm.

Example 3

The oxide raw material in Example 1 was changed to Oxide Raw Material No. 3 below, and the centrifugal casting conditions were set as below. Other than that, an evaluation sample was created under the same conditions as Example 1. Note that the final length of the transparent ceramic is the length that the polarization plane rotates by 45°, presuming that a magnetic flux density of 1.6 T is applied to the Faraday rotator, and is 17 mm in this Example $((Tb_{0.797}Y_{0.199}Sc_{0.004})_3(Al_{0.97}Sc_{0.03})_5O_{12})$.

(Oxide Raw Material No. 3)

Mixed powder for $(Tb_{0.797}Y_{0.199}Sc_{0.004})_3(Al_{0.97}Sc_{0.03})_5O_{12}$ was prepared by weighing so that the numbers of moles of terbium, yttrium, aluminum and scandium are Tb:Y:Sc:Al=2.391:0.597:0.162:4.850, respectively. Subsequently, TEOS as a sintering aid was weighed so that the addition amount thereof was 100 ppm in $SiO_2$ conversion, and added to obtain Oxide Raw Material No. 3.

Centrifugal Casting

Using Oxide Raw Material No. 3, the preliminary centrifugation treatment of steps S11 to S14 in Example 1 was not performed (i.e., the number of executions: zero), and other conditions were the same as those of Example 1 to obtain a cast dried compact.

In addition, the oxide raw material in Comparative Example 1 was changed to Oxide Raw Material No. 3 below. Other than that, an evaluation sample (Comparative Example 3) was created under the same conditions as Comparative Example 1. Note that the final length of the transparent ceramic in this Comparative Example is 17 mm.

The optical properties (total light transmittance and extinction ratio) of each sample obtained as described above were evaluated as below.

Total Light Transmittance

The total light transmittance of each of the transparent ceramics was measured with reference to JIS K7105 (ISO 13468-2: 1999). A spectrophotometer (V-670, manufactured by JASCO Corporation) was used for the measurement. The measurement was performed by a double beam method using a halogen lamp as a light source, and a photomultiplier tube (wavelength of 750 nm or less) and a PbS photoelectric cell (wavelength of 750 nm or more) as detectors. For the total light transmittance, a value at a wavelength of 1,064 nm was used. The total light transmittance was measured for five samples from each Example and was evaluated with three significant figures and percentage as unit.

Extinction Ratio

With reference to JIS C5877-2: 2012, the extinction ratio was measured by an optical system using and assembling a laser light source (manufactured by NKT Photonics), a power meter (manufactured by Gentec), a Ge photodetector (manufactured by Gentec) and polarizers (manufactured by Sigmakoki Co., Ltd.). The laser light used had a wavelength of 1,064 nm and a beam diameter of 1 to 3 mm$\phi$. The room temperature at the time of measurement was 24° C.

First, two polarizers were rotated in the absence of the samples, the polarizers were fixed at positions where the power of light become maximum, and power $P_{//}$ of the light was measured. Thereafter, the sample was inserted between the two polarizers, the polarizer (analyzer) near the detector was rotated by 90° to form crossed nicols, and power $P_\perp$ of the light at this time was measured. The extinction ratio (dB) was determined based on the following equation:

Extinction Ratio (dB)=10 $\log_{10}(P_{//}/P_\perp)$

The above results are summarized in Table 1. Note that the mark "○" in the molding step in Table 1 indicates that the treatment was performed, and the number in parentheses is the number of executions. In addition, the mark "-" indicates that the treatment is irrelevant in that Example or Comparative Example.

maximum centrifugal force was set in six levels in the range from 200 to 1,500 G, and the preliminary centrifugation treatment was performed for five minutes.

Next, the following evaluation was performed.

Measurement of Settling Distance

The centrifuge tube after each centrifugation treatment was placed upright, and the distance between the liquid surface of each supernatant (the uppermost surface of the contents) and the upper surface of the sediment (i.e., the interface between the supernatant liquid and the sediment) was measured as the settling distance.

Stiffness Evaluation

Furthermore, the supernatant in the centrifuge tube was removed, and the sediment in the centrifugal tube was stirred with a microspatula to evaluate the stiffness (difficulty to stir) of the sediment. Evaluation was made in three stages, ○ (good (solidification degree is small and stirring operation is easy)), Δ (satisfactory (solidification has advanced to some extent, but stirring operation is possible)), and x (bad

TABLE 1

| | Oxide | | Molding Step | | | Length of | Evaluation Result | |
|---|---|---|---|---|---|---|---|---|
| | Raw Material No. | Composition of Complex Oxide | Preliminary Centrifugation | Centrifugal Casting - Drying | Uniaxial Pressing - CIP | Transparent Ceramic (mm) | Total Light Transmittance (%) | Extinction Ratio (dB) |
| Example 1 | 1 | $(Tb_{0.598}Y_{0.398}Sc_{0.004})_3(Al_{0.97}Sc_{0.03})_5O_{12}$ | ○ (2) | ○ | — | 24 | 99.9 | 49 |
| Example 2 | 2 | $(Tb_{0.697}Y_{0.299}Sc_{0.004})_3(Al_{0.97}Sc_{0.03})_5O_{12}$ | ○ (1) | ○ | — | 20 | 99.9 | 48 |
| Example 3 | 3 | $(Tb_{0.797}Y_{0.199}Sc_{0.004})_3(Al_{0.97}Sc_{0.03})_5O_{12}$ | N/A | ○ | — | 17 | 99.8 | 45 |
| Comparative Example 1 | 1 | $(Tb_{0.598}Y_{0.398}Sc_{0.004})_3(Al_{0.97}Sc_{0.03})_5O_{12}$ | — | — | ○ | 24 | 99.9 | 37 |
| Comparative Example 2 | 2 | $(Tb_{0.697}Y_{0.299}Sc_{0.004})_3(Al_{0.97}Sc_{0.03})_5O_{12}$ | — | — | ○ | 20 | 99.9 | 35 |
| Comparative Example 3 | 3 | $(Tb_{0.797}Y_{0.199}Sc_{0.004})_3(Al_{0.97}Sc_{0.03})_5O_{12}$ | — | — | ○ | 17 | 99.8 | 34 |

From the above results, the total light transmittance of all the transparent ceramics (Examples 1 to 3) created by the centrifugal casting method was 99.8% or 99.9%. In addition, the total light transmittance of all the transparent ceramics (Comparative Examples 1 to 3) created by the pressing method was also 99.8% or 99.9%. That is, it was confirmed that the transparent ceramics created by the centrifugal casting method exhibit transparency equivalent to that of the transparent ceramics created by the pressing method. Moreover, while the extinction ratios of the transparent ceramics (Examples 1 to 3) created by the centrifugal casting method were 45 to 49 dB, the extinction ratios of the transparent ceramics (Comparative Examples 1 to 3) created by the pressing method were 34 to 37 dB. That is, it was confirmed that cubic transparent ceramics with higher extinction ratio performance can be produced by using the centrifugal casting method than the pressing method.

Test Example 1

The settling distance by the centrifugal force in the preliminary centrifugation treatment was measured by using the slip prepared in Example 1 (i.e., the slip prepared using Oxide Raw Material No. 1). That is, this slip was divided into six portions, 16 mL of each portion was packed in a polypropylene round bottom centrifuge tube (inner diameter: 14 mm$\phi$, length: 150 mm, maximum volume: 16 mL), each tube was set in the same centrifuge as in Example 1, the (solidification degree is large and stirring operation is difficult)), in order of less hardness (solidification degree) of the sediment (having more fluidity and stirring operation is easier).

The above results are shown in Table 2.

TABLE 2

| | Preliminary Centrifugation Treatment Centrifugal Force (G) | Evaluation Result | |
|---|---|---|---|
| | | Settling Distance (mm) | Stiffness Evaluation |
| Test Example 1-1 | 200 | 0 | ○ |
| Test Example 1-2 | 300 | 2 | ○ |
| Test Example 1-3 | 500 | 15 | ○ |
| Test Example 1-4 | 750 | 21 | ○ |
| Test Example 1-5 | 1,000 | 29 | Δ |
| Test Example 1-6 | 1,500 | 45 | x |

From the above results, the settling distance in the case with the centrifugal force of 200 G (Test Example 1-1) is 0 mm, and the concentrating effect of the dispersoid is not sufficiently obtained by the centrifugation operation for five minutes. Moreover, the settling distance in the case with the centrifugal force of 300 G (Test Example 1-2) is 2 mm, and the concentrating effect of is obtained to some extent by the centrifugation operation for five minutes. In the cases with the centrifugal forces of 500 G and 750 G (Test Examples 1-3 and 1-4), the settling distances are 15 mm and 21 mm, respectively, the concentrating effects of the dispersoids are sufficiently obtained, the solidification degrees of the sediments are also low, and stirring is easy. Furthermore, in the case with the centrifugal force of 1,000 G (Test Example 1-5), the settling distance is 29 mm, and the concentrating effect of the dispersoid is sufficiently obtained. At this time, the solidification of the sediment was progressed to some extent, and the fluidity was low, but the stirring operation was possible. Thus, the result is within the allowable range. On the other hand, in the case with the centrifugal force of 1,500 G (Test Example 1-6), the settling distance is 45 mm, and the concentrating effect of the dispersoid is sufficiently obtained. However, the solidification (concentrating) of the sediment had progressed, the sediment was stiff, and the stirring operation was difficult. Therefore, in the preliminary centrifugation treatment, the concentration difference between the sediment and the slip is large at the time of subsequently adding the slip, and it becomes difficult to uniformly mix.

From the above, the centrifugal force of 300 to 1,000 G is effective in the preliminary centrifugation treatment of the present invention, and the centrifugal force of 500 G to 750 G is most effective.

Test Example 2

Using the slip obtained in Example 1, the preliminary centrifugation treatment was performed with a centrifugal force of 500 G, and the relationship between the number of executions of the preliminary centrifugation treatment and the length of the sintered body was evaluated.

That is, 16 mL of the resulting slip was packed in each of six polypropylene round bottom centrifuge tubes (inner diameter: 14 mm$\phi$, length: 150 mm, maximum volume: 16 mL), and then the number of executions of the preliminary centrifugation treatment of steps S21 to S24 below was set to six different numbers, from zero to five, to be performed (i.e., the preliminary centrifugation treatment was performed zero time (not performing the preliminary centrifugation treatment), only one time, and two to five times).

Step S21

Set the round bottom centrifuge tube in the same centrifuge as in Example 1.

Step S22

Perform the preliminary centrifugation treatment for five minutes with the maximum centrifugal force of 500 G.

Step S23

After the completion of the centrifugation, remove the supernatant in the round bottom centrifuge tube, and add the slip again so as to make the volume 16 mL.

Step S24

Stir the interface between the sediment and the added slip in the round bottom centrifuge tube with a microspatula to mix and homogenize.

Next, the round bottom centrifuge tube after the preliminary centrifugation treatment was set in the same centrifuge, and the centrifugal casting was performed for 60 minutes with the maximum centrifugal force of 2,500 G.

After the centrifugal casting, the supernatant in the round bottom centrifuge tube was removed, and the solvent was naturally dried to obtain a cast dried compact.

The resulting cast dried compact was subjected to degreasing treatment by retention for 24 hours at 800° C. in a muffle furnace. Subsequently, the degreased compact was placed in a vacuum furnace and treated for three hours at 1,600° C. Each resulting sintered body was placed in a carbon heater HIP furnace and subjected to HIP treatment under the conditions of Ar, 200 MPa, 1,700° C., and two hours.

Figure 2:
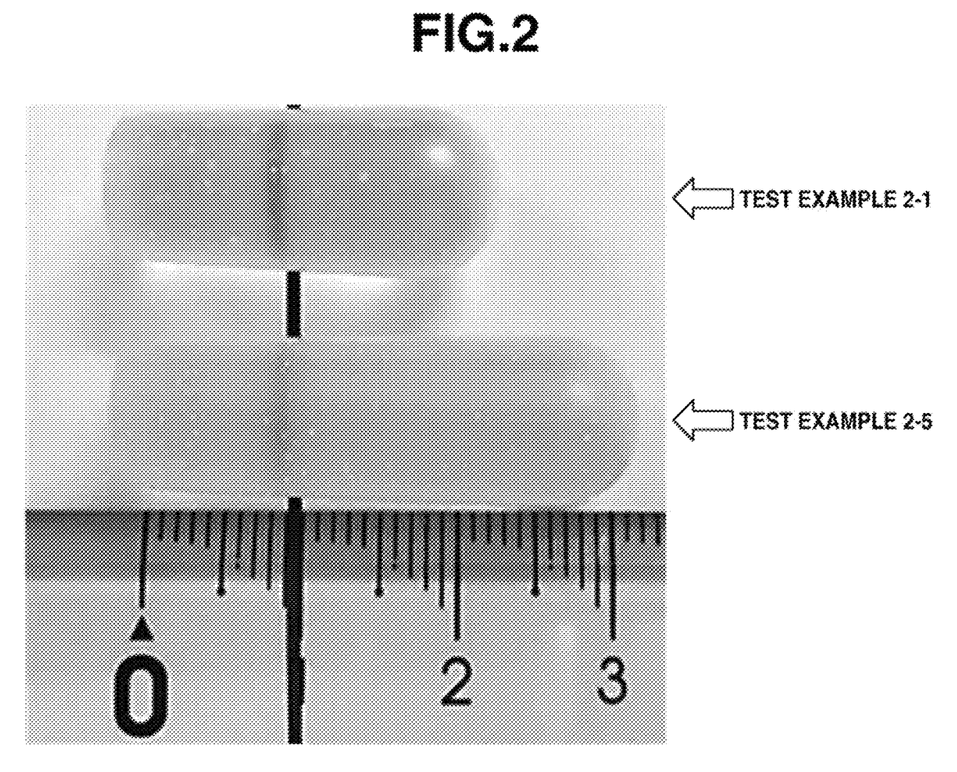
FIG. 2 is a view showing appearances of a sintered body of Test Example 2-1 (upper side in the drawing) and a sintered body of Test Example 2-5 (lower side in the drawing) in Test Example 2.

FIG. 2 shows the appearances of the transparent sintered bodies of Test Examples 2-1 and 2-5 as Examples.

Moreover, the overall lengths (lengths in the centrifugal force direction) of the resulting HIP-treated sintered bodies (shell form sintered body) were measured. Furthermore, the change rate of the length of the sintered body by the preliminary centrifugation treatment was determined based on the following equation:

Change Rate (%)=Length of Sintered Body Concentrated $n$ Times/Length of Sintered Body Concentrated $(n-1)$Times×100 wherein n is an integer of 1 or more.

The above results are shown in Table 3.

TABLE 3

| | Preliminary Centrifugation Treatment Number of Executions n | Evaluation Result | |
|---|---|---|---|
| | | Length of Sintered Body (mm) | Change Rate (%) |
| Test Example 2-1 | 0 | 21.1 | — |
| Test Example 2-2 | 1 | 25.5 | 121 |
| Test Example 2-3 | 2 | 28.1 | 110 |
| Test Example 2-4 | 3 | 29.6 | 105 |
| Test Example 2-5 | 4 | 30.8 | 104 |
| Test Example 2-6 | 5 | 31.2 | 101 |

From the above results, the sintered bodies (Test Examples 2-2 to 2-6) obtained by performing the preliminary centrifugation treatment one to five times were longer than the sintered body (Test Example 2-1) obtained by performing the preliminary centrifugation treatment zero time, and it was confirmed that the preliminary centrifugation treatment is effective in elongating the sintered body. Note that the difference between the lengths of the sintered bodies obtained by performing the preliminary centrifugation treatment four and five times was 0.4 mm, and the obtained effect of elongating the length of the sintered body was only about 1%. Thus, it was found that performing the preliminary centrifugation treatment five times or more is less effective in the elongation.

In addition, the sintered bodies of Test Examples 2-1 and 2-6 were subjected to cylindrical grinding to a diameter of 5 mm, and both end faces were subjected to grinding and polishing treatments (final optical polishing to an optical surface accuracy of $\lambda/8$ (in the case of measurement wavelength $\lambda$=633 nm)) to obtain transparent ceramics having respective lengths of 20 mm (Test Example 2-1) and 30 mm (Test Example 2-6). As described above, according to the present invention, a transparent ceramic for a Faraday rotator with a length (optical path length) of 30 mm can be created.

Note that, although the present invention has been described with reference to the above embodiments so far, the present invention is not limited to these embodiments and can be changed within a scope that a person skilled in the art can conceive, such as other embodiments, additions, modifications and deletions, and any aspects are included in the scope of the present invention as long as the effects of the present invention are exerted.

Japanese Patent Application No. 2018-103013 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing a transparent ceramic material for a Faraday rotator comprising the steps of:
preparing a slurry or slip composed of a dispersion medium and a dispersoid including sinterable raw material powder containing a complex oxide powder represented by the following formula (1):

$$(Tb_{1-x-y}R_xSc_y)_3(Al_{1-z}Sc_z)_5O_{12} \quad (1)$$

wherein R is yttrium and/or lutetium, $0.05 \leq x < 0.45$, $0 < y < 0.1$, $0.5 < 1-x-y < 0.95$, and $0.004 < z < 0.2$;
enclosing the slurry or slip in a mold container and subjecting the mold container with the slurry or slip to centrifugal casting to separate the slurry or slip into a solid and liquid thereby molding a cast compact;
drying the cast compact;
degreasing a dried compact;
sintering a degreased compact; and
further subjecting a sintered body to a hot isostatic pressing treatment to obtain a transparent ceramic material composed of the sintered body of garnet-type rare earth complex oxide represented by the formula (1).

2. The method according to claim 1, further comprising the step of performing the following treatment at least once before subjecting to centrifugal casting, and thereafter subjecting the mold container with the slurry or slip to centrifugal casting,
the treatment comprising subjecting the mold container with the slurry or slip to preliminary centrifugation treatment to separate and remove some of the dispersion medium from the slurry or slip thereby concentrating the dispersoid in it, and further enclosing additional prepared slurry or slip into the mold container.

3. The method according to claim 2, wherein when the additional prepared slurry or slip is added into the mold container, an interface between the added slurry or slip and a sediment of the dispersoid and the remaining dispersion medium in the mold container is stirred and mixed to be enclosed.

4. The method according to claim 2, wherein the preliminary centrifugation treatment is performed with a centrifugal force of 300 to 1,000 G.

5. The method according to claim 1, wherein the centrifugal casting is performed with a centrifugal force of 1,500 to 5,000 G.

6. The method according to claim 1, wherein R is yttrium.

7. The method according to claim 1, wherein the sinterable raw material powder further contains a sintering aid.

8. The method according to claim 1, wherein the dispersoid includes the sinterable raw material powder and a binder.

9. The method according to claim 1, wherein the dispersion medium is water and/or a lower alcohol having 1 to 4 carbon atoms.

10. The method according to claim 1, wherein the slip is a sediment obtained by allowing the slurry composed of the dispersion medium and the dispersoid including the sinterable raw material powder to stand for a predetermined time.

11. The method according to claim 1, wherein the mold container is a cylindrical container having a longitudinal direction as a centrifugal direction of the centrifugal casting.

12. The method according to claim 1, wherein the transparent ceramic material with an extinction ratio of 40 dB or more at a wavelength of 1,064 nm for an optical path length of 25 mm is obtained, the extinction ratio being measured in accordance with a polarizer test method of JIS C5877-2: 2012.

* * * * *